United States Patent [19]
Baldacci

[11] 4,376,539
[45] Mar. 15, 1983

[54] HEAD GASKET ASSEMBLY FOR DIESEL ENGINES

[75] Inventor: John W. Baldacci, Arlington Heights, Ill.

[73] Assignee: Felt Products Mfg. Co., Skokie, Ill.

[21] Appl. No.: 382,707

[22] Filed: May 27, 1982

[51] Int. Cl.³ .............................................. F16J 15/12
[52] U.S. Cl. .......................................... 277/1; 277/9; 277/235 B; 277/DIG. 10
[58] Field of Search .................... 277/1, 9, 9.5, 10, 11, 277/26, 235 R, 235 A, 235 B, 236, 237, DIG. 10

[56] References Cited

U.S. PATENT DOCUMENTS

| | | | |
|---|---|---|---|
| 949,658 | 2/1910 | Randall | 277/11 |
| 1,771,596 | 7/1930 | Victor | 277/9 X |
| 1,942,704 | 1/1934 | Hubbard et al. | 277/11 |
| 2,140,710 | 12/1938 | Meisel | 277/1 X |
| 2,462,762 | 2/1949 | Nardin | 277/11 |
| 2,753,199 | 7/1956 | Victor | 277/235 B X |
| 3,560,007 | 2/1971 | Ascencio | 277/235 B |
| 3,565,449 | 2/1971 | Ascencio et al. | 277/235 B |
| 3,586,338 | 6/1971 | Miklau et al. | 277/235 B X |

FOREIGN PATENT DOCUMENTS 2347321 3/1975 Fed. Rep. of Germany ... 277/235 B

*Primary Examiner*—Robert S. Ward, Jr.

[57] ABSTRACT

A diesel head gasket assembly comprising a heat sensitive, multilayer main body defining water and oil apertures and combustion openings and fire rings each comprising an annulus supported in the combustion openings by individual spaced U-shaped tabs. The tabs are bonded to the annulus by a spot-weld or adhesive mass and support the annulus in the combustion opening. Desirably when the gasket is installed between the head and block and they are closed, the annulus may break away from the tabs, i.e., to break or rupture the spot-weld or adhesive mass or bond, so that the annulus may readily move to an elevation relative to the main body different from the initial position of the annulus.

12 Claims, 6 Drawing Figures

U.S. Patent        Mar. 15, 1983        4,376,539
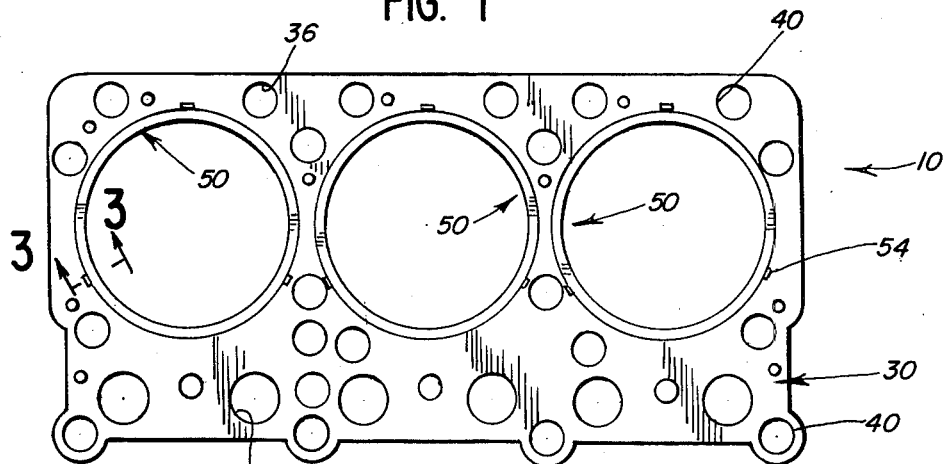
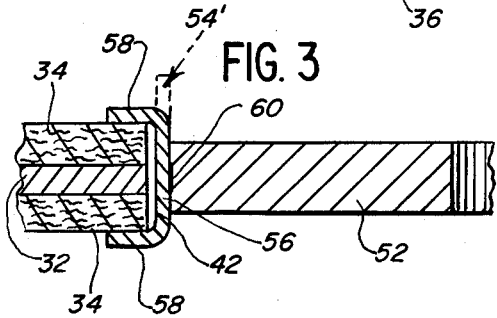
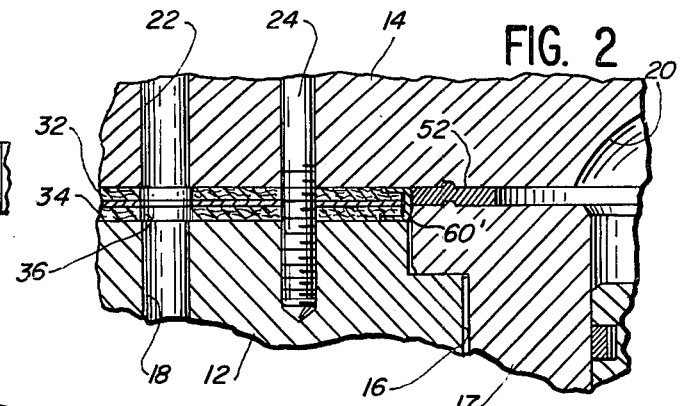
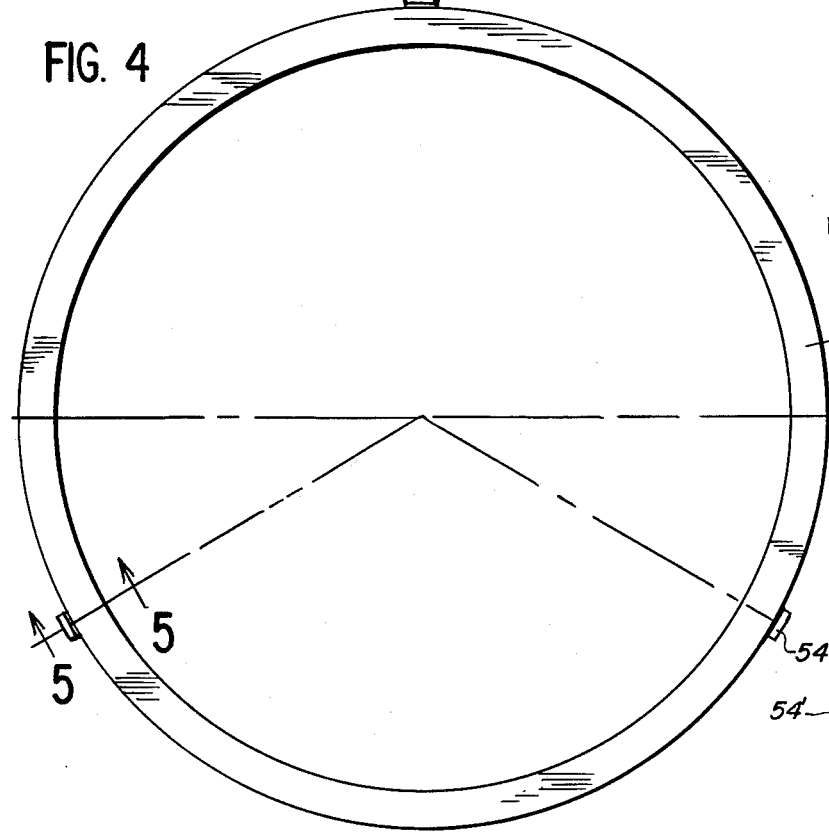
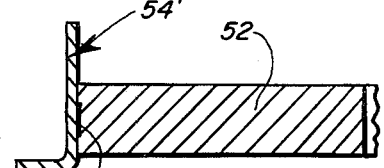
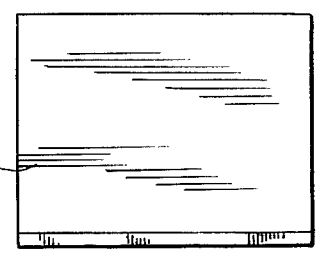

HEAD GASKET ASSEMBLY FOR DIESEL ENGINES

TECHNICAL FIELD

This invention relates to improvements in head gaskets for internal combustion engines, and particularly for high-compression diesel engines.

BACKGROUND OF THE INVENTION

There are a variety of head gaskets known in the prior art. Head gaskets generally comprise relatively thin, generally flat bodies which define a plurality of apertures, including oil and water bores and combustion openings.

In high-compression diesel engines operating at high temperatures and high pressures, it has been a practice for a number of years now to provide head gaskets with armoring adjacent the cylinder or combustion openings to seal the combustion openings and to protect the remainder of the gasket from the effects of the high temperature and pressure. Early armoring covered the entire gasket surface as well as the edges of the combustion openings, and such armoring is typified by the showing in U.S. Pat. No. 1,819,694.

It was found subsequently that armor at or embracing the edges of the gasket body adjacent the combustion openings was sufficient to protect the gasket body and to seal the head and block around the combustion opening. It has also been suggested that head gasket armor be positioned in a combustion opening and be suspended from integral tabs which project from the armor into engagement with the gasket body, and a head gasket of this type is illustrated in U.S. Pat. No. 3,565,449.

SUMMARY OF THE INVENTION

In accordance with the present invention, an improved head gasket assembly is provided for effectively sealing diesel engines, all without significantly interfering with the basic gasket construction, load distribution and manufacturing procedures.

In a preferred form the diesel head gasket assembly of this invention comprises a heat-sensitive, multilayered main gasket body including a metallic layer and at least one heat-sensitive sealing layer of a filler and an impregnant, the body defining at least one combustion opening and a plurality of apertures. The gasket assembly further includes a fire ring suspended in each combustion opening, the fire ring comprising a metallic annulus closely confronting the peripheral edge of the associated combustion opening and a plurality of spaced tabs bonded to the annulus. Each tab comprises a central web bonded to the annulus and a pair of spaced arms overlying and embracing the main gasket body to support and maintain the annulus in the combustion opening closely confronting the peripheral edge of the opening. Desirably, the tabs are at least three in number and the annulus is rectangular in cross-section. Preferably the bonding means comprises a spot weld. The tabs are relatively weaker than the fire ring and as such may deform so the annulus may relocate to an elevation somewhat different from its initial elevation. Most desirably, the bonding means may provide a weak bond, so that under stress the annulus may break away from the tabs so that the annulus may separate from the tabs to relocate to the elevation different from its initial elevation relative to the main gasket body.

Further objects, features and advantages of this invention will become apparent from the following description and drawings showing a presently preferred embodiment.

BRIEF DESCRIPTION OF THE DRAWINGS

FIG. 1 is a plan view of a cylinder head gasket made in accordance with the present invention;

FIG. 2 is a sectional view of the cylinder head gasket of FIG. 1, positioned between a head and block of an internal combustion diesel engine;

FIG. 3 is an enlarged partial perspective view of a section of FIG. 1 taken substantially along line 3—3 of FIG. 1;

FIG. 4 is an enlarged portion of FIG. 1;

FIG. 5 is an enlarged cross-sectional view taken substantially along line 5—5 of FIG. 4;

FIG. 6 is an enlarged side elevational view of the tab of FIG. 5.

DETAILED DESCRIPTION OF AN ILLUSTRATIVE EMBODIMENT

Referring first to FIGS. 1 and 2, a presently preferred diesel cylinder head gasket 10 of this invention is there shown. Gasket 10 is adapted and proportioned to cooperate with an engine block 12 and an engine head 14.

Block 12 defines a plurality of apertures including a plurality of combustion cylinders or chambers 16 and liners 17 and a plurality of oil and water bores 18. Head 14 defines a combustion chamber portion 20 overlying each chamber 16, and further defines a plurality of oil and water bores 22 which are aligned with the complementary aligned bores 18 in the block. Threaded bolts 24 connect the head and block and serve as the means for torquing and compressing gasket assembly 10 into sealing engagement with the block and head around the apertures therein.

As seen, the head gasket 10 comprises a main gasket body 30, which body is a heat-sensitive multilayer assemblage. Body 30 comprises a central core or layer 32 which may be a metal sheet. Each side of central layer 32 is provided with a heat-sensitive sealing layer or sheet 34, as of impregnated asbestos. A conventional temperature, oil and water resistant impregnant such as a nitrile rubber may be used. Other known fillers than asbestos may be used as well. The core 32 and sheets 34 are superposed with each other and are laminated, as with adhesive, to hold the sheets of the main gasket body 30 together in a known manner. In the embodiment illustrated, the metal core 32 is 0.012 inch thick and sheets 34 are 0.030 inch thick.

Thereafter suitably positioned and proportioned apertures and openings are formed, as by punching. These openings and apertures include oil and water apertures 36 which are proportioned and positioned to surround the confronting ported ends of block and head oil and water bores 18 and 22. Apertures 36 permit flow communication between those bores and sealingly prevent leakage of fluid beyond the apertures 36. Bolt holes 40 are also provided in the body 30 to accommodate passage of the bolts 24 through head 14 and into threaded engagement with cooperating threaded holes in the block 12.

Finally, the gasket assembly 10 defines a plurality of apertures which surround the cylinder bores, adjacent which apertures the cylinders are designed to be sealed from the surrounding portions of the gasket assembly. To that end, the main gasket body 30 defines a plurality of clear through combustion openings 42 which, in the embodiment illustrated, are generally circular. A second gasket, a fire ring 50, is provided within the periphery defined by each of these combustion openings.

Fire ring 50 comprises a metallic annulus 52 which in the embodiment shown, is generally rectangular in cross-section and which may be butt-welded to provide the closed annulus. The annulus may be formed of an annealed soft steel of an inner diameter of about 5.10 inches and an outer diameter of about 5.46 inches and a thickness of about 0.056 inch. Although the preferred annulus is generally rectangular in cross-section, where appropriate, annuli of oval, square, round or other cross-sections may be used as well.

The fire ring 50 further comprises a plurality of tabs, preferably at least three in number, which are bonded and secured, as by welding, brazing or adhesive to the annulus 52. The several tabs include arms which overlie and underlie the main gasket body. Preferably each tab comprises a pair of such arms. Thus, when the preferred tabs are used, when the gasket is completed, each tab 54 is generally U-shaped in cross section (see FIG. 3). As best seen in FIG. 3 the annulus 52 is slightly less in outer diameter than the diameter of the combustion opening 42. The U-shaped tabs 54 comprise a central web 56 and a pair of arms 58 which extend outwardly and over and under, respectively, the main gasket body 30, thereby to support and retain the fire ring 50 in the combustion opening 42, and closely confronting the peripheral edge of the combustion opening. The weld (or braze or body or mass of adhesive) 60 serves to bond the tabs 54 to the annulus 52, at least until the gasket 10 is installed.

Although cylinder head gaskets comprising a main gasket body and a fire ring have been known and used for some time, in some environments great difficulty has been encountered in properly installing the gaskets and fire rings. For example, gaskets of the type described here have been used but without a satisfactory means for properly locating and securing the fire ring. When it is understood that such gaskets are frequently installed with the engine in a vertical, rather than in the horizontal position of use, it will be appreciated that great difficulty in properly aligning, locating and positioning of separate fire ring has been encountered.

Therefore, the present integrated head gasket assembly is a substantial improvement and innovation in the art.

In accordance with the present invention a suitable main gasket body 30 is prepared. The fire ring is fabricated, preferably with at least three pre-tabs 54' as shown in FIGS. 4–6. The pre-tabs 54' in the embodiment shown, are bonded as by spotwelding to the annulus 52. The tabs may be of mild steel. The area of the spot-weld may be in an amount of 0.025 square inch. A typical adhesive mass which might be used in lieu of a spot-weld is an epoxy adhesive. Thereafter the pre-assembled fire ring is placed in a combustion opening 42 and the pre-tabs 54' are folded (from the dotted line position of FIG. 3 to the full line position of FIG. 3) to provide the central web 56 and the arms 58 which reach outwardly and embrace between them a portion of the main gasket body 30 adjacent the combustion opening 42.

The three tabs 54 serve to locate and hold the fire ring in place in the head gasket 10. As such, when the head gasket is installed, the main gasket body and fire rings are installed together and the fire rings are properly located. In prior art constructions it was frequently necessary to apply adhesive or other means for holding separate fire rings, like annuli 52, in their proper locations as the engine and block were closed, something which was extremely difficult to achieve effectively when the engine was positioned vertically for repair rather than in the horizontal position of use. Further, the association of the fire ring with the gasket assembly serves to guarantee that a fire ring will be installed during repair, rather than omitted as occasionally has occurred in the past. Unitization of the associated gasketing members also facilitates shipping to make certain all of the necessary parts will be available at the time of installation.

The assembly of the fire ring and gasket body also permits optimization of those parts with respect to each other, thus making certain that parts within desired selected portions of the tolerance ranges are used with each other. Thus the maximum end of the tolerance range gasket bodies and fire rings can be used together as can minimums, thereby to enhance the sealing effect of the head gasket assembly.

It should also be noted that the use of individual tabs having vertically aligned arms 58 is efficient and uses and wastes much less material than devices of the types shown in Ascencio U.S. Pat. No. 3,565,449.

Finally, the fire ring is proportioned with the gasket body so that where desireable the fire ring may separate from the gasket body as installation progresses, all so that the fire ring may become positioned at the appropriate elevation with respect to the main gasket body. It is known that for some engines some stand-off of the fire ring vis-a-vis the gasket body is designed for and therefore necessary. With engines where this feature is important, the bonding medium (the weld, braze or adhesive mass) may be sufficiently weak so that when the gasket assembly is positioned between the head and block and is under stress, as when the fire ring is elevated relative to its initial position relative to the gasket body (as the head and block are closed, i.e, moving from the position illustrated by FIG. 3 to the fully installed position illustrated by FIG. 2), the bond breaks or ruptures and the annulus breaks away from the tabs, freeing the annulus to move independently of the tabs to the desired position in the engine. The ruptured bond 60' is shown in FIG. 2. Whether the annulus will move independently of the tabs will depend upon a variety of factors, such as the thickness of the core metal (the thinner the core the more flexible, hence the less likely to promote breakage of the bond between tabs and annulus), the strength and nature of the bond, the material of which the tabs are made and their relative deformability, the thickness and compressibility of the core and facing materials among others.

It will be apparent from the foregoing description and drawings that modifications may be made without departing from the spirit and scope of this invention. Accordingly, the present invention is not to be considered to be limited to the specific embodiment illustrated, except insofar as may be required by the following claims.

What is claimed is:

1. A diesel head gasket assembly comprising a heat-sensitive, multilayered main gasket body comprising a metallic layer and at least one heat-sensitive sealing layer of a filler and an impregnant, said main gasket body defining at least one combustion opening and a plurality of apertures, a fire ring suspended in each said combustion opening, each said fire ring comprising a metallic annulus closely confronting the peripheral edge of the associated combustion opening and a plurality of spaced tabs bonded to said annulus, means bonding said tabs to said annulus, said tabs collectively including a plurality of arms overlying and underlying and embracing the main gasket body thereby to support and maintain said annulus in said combustion opening closely confronting the peripheral edge of said opening, said tabs being bonded to said annulus.

2. A diesel head gasket assembly in accordance with claim 1 in which said tabs are at least three in number.

3. A diesel head gasket assembly in accordance with claim 1 in which said annulus is generally rectangular in cross-section.

4. A diesel head gasket assembly in accordance with claim 1 in which said bonding means comprises a spot weld.

5. A diesel head gasket assembly in accordance with claim 1 in which said bonding means comprises an adhesive mass.

6. A diesel head gasket assembly in accordance with claim 1 in which said bonding means is weak, so that under stress the annulus may break away from said tabs.

7. A diesel head gasket assembly in accordance with claim 1 wherein each of said tabs comprises a central web bonded to said annulus and a pair of spaced arms embracing main gasket body.

8. A method of sealing a diesel internal combustion engine comprising the steps of providing a diesel head gasket assembly having a heat-sensitive, multilayered main gasket body comprising a metallic layer and at least one heat-sensitive sealing layer of a filler and an impregnant, said main gasket body defining at least one combustion opening and a plurality of apertures, and further having a fire ring suspended in each said combustion opening, each said fire ring comprising a metallic annulus closely confronting the peripheral edge of the associated combustion opening and a plurality of spaced tabs bonded to said annulus, means weakly bonding said tabs to said annulus, each said tab comprising a central web bonded to said annulus and a pair of spaced arms overlying and embracing the main gasket body thereby to support and maintain said annulus in said combustion opening closely confronting the peripheral edge of said opening, positioning said gasket assembly between the head and block of said engine, and closing said head and block and, while doing so, relocating said annulus to a different elevation relative to said main gasket body than the initial elevation of said annulus.

9. The method in accordance with claim 8 in which said annulus is generally rectangular in cross-section.

10. The method in accordance with claim 8 in which said bonding means comprises a spot weld.

11. The method in accordance with claim 8 in which said bonding means comprises an adhesive mass.

12. The method in accordance with claim 8 wherein, while closing said head and block, said bond between said tabs and said annulus is broken.

* * * * *